(12) United States Patent
Castaneda et al.

(10) Patent No.: US 8,223,640 B2
(45) Date of Patent: *Jul. 17, 2012

(54) SYNCHRONOUS TRAFFIC SHAPING

(75) Inventors: Frank J. Castaneda, Raleigh, NC (US); Joseph K. Horvath, Wake Forest, NC (US); Anthony W. Wrobel, Jr., Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 497 days.

This patent is subject to a terminal disclaimer.

(21) Appl. No.: 11/740,144

(22) Filed: Apr. 25, 2007

(65) Prior Publication Data

US 2008/0212474 A1 Sep. 4, 2008

Related U.S. Application Data

(63) Continuation-in-part of application No. 11/680,874, filed on Mar. 1, 2007.

(51) Int. Cl.
*G01R 31/08* (2006.01)
*G06F 11/00* (2006.01)
*G06F 15/16* (2006.01)
*G06F 15/173* (2006.01)
*H04J 1/16* (2006.01)
*H04L 12/26* (2006.01)

(52) U.S. Cl. ............ 370/230.1; 370/236; 709/219; 709/225; 709/226; 709/247

(58) Field of Classification Search .......... 370/229–240; 709/216, 219, 225–226, 229, 247
See application file for complete search history.

(56) References Cited

U.S. PATENT DOCUMENTS 5,926,459 A * 7/1999 Lyles et al. ............... 370/230
6,098,091 A * 8/2000 Kisor ......................... 709/202
(Continued)

OTHER PUBLICATIONS

United States Patent and Trademark Office, Office Action for U.S. Appl. No. 11/680,874, May 6, 2009, pp. 1-38, Alexandria, VA, USA.

(Continued)

*Primary Examiner* — Alpus H Hsu
*Assistant Examiner* — Jeremy Costin
(74) *Attorney, Agent, or Firm* — Lee Law, PLLC; Christopher B. Lee

(57) ABSTRACT

A method, a system, and a computer program product implements traffic shaping by processing as a synchronous request, tasks representing one or more units of work contained within the request. Before a request is sent through the network, the request is inspected in order to derive the amount of work that the request would generate in the network. A traffic manager queries the amount of work in that request compared to the amount of work that the network can support and generates a number of traffic envelopes. Based on the results of this query, "task pruning" may be implemented to break the request into smaller manageable task that fit into the traffic envelopes. Task pruning may also enable only a subset of the work to be performed. Thus, a measure of the amount of work, rather than the amount of data, within a request is considered when scheduling the request.

20 Claims, 5 Drawing Sheets

U.S. PATENT DOCUMENTS

| | | | |
|---|---|---|---|
| 7,274,684 B2 | 9/2007 | Young et al. | |
| 7,460,476 B1 | 12/2008 | Morris et al. | |
| 7,493,380 B2 | 2/2009 | Aman et al. | |
| 2002/0026502 A1 | 2/2002 | Phillips et al. | |
| 2002/0133593 A1* | 9/2002 | Johnson et al. | 709/226 |
| 2004/0015600 A1 | 1/2004 | Tiwary et al. | |
| 2004/0071096 A1* | 4/2004 | Na et al. | 370/252 |
| 2004/0109410 A1* | 6/2004 | Chase et al. | 370/229 |
| 2004/0202191 A1* | 10/2004 | Vrabel | 370/412 |
| 2005/0002453 A1* | 1/2005 | Chang et al. | 375/240.03 |
| 2005/0235013 A1* | 10/2005 | Li et al. | 707/204 |
| 2006/0018324 A1* | 1/2006 | Nisar et al. | 370/395.51 |
| 2006/0146820 A1* | 7/2006 | Friedman et al. | 370/390 |
| 2006/0233100 A1* | 10/2006 | Luft et al. | 370/229 |
| 2008/0069133 A1* | 3/2008 | Yong et al. | 370/443 |

OTHER PUBLICATIONS

United States Patent and Trademark Office, Office Action for U.S. Appl. No. 11/680,874, Dec. 15, 2009, pp. 1-42, Alexandria, VA, USA.

United States Patent and Trademark Office, Office Action for U.S. Appl. No. 11/680,874, Jun. 14, 2010, pp. 1-47, Alexandria, VA, USA.

United States Patent and Trademark Office, Office Action for U.S. Appl. No. 11/680,874, Dec. 8, 2010, pp. 1-9, Alexandria, VA, USA.

United States Patent and Trademark Office, Office Action for U.S. Appl. No. 11/680,874, Jun. 16, 2011, pp. 1-13, Alexandria, VA, USA.

United States Patent and Trademark Office, Office Action for U.S. Appl. No. 11/680,874, Dec. 6, 2011, pp. 1-47, Alexandria, VA, USA.

United States Patent and Trademark Office, Notice of Allowance for U.S. Appl. No. 11/680,874, Apr. 6, 2012, pp. 1-9, Alexandria, VA, USA.

* cited by examiner

SYNCHRONOUS TRAFFIC SHAPING

CONTINUATION-IN-PART APPLICATION

The present application is a continuation-in-part of U.S. patent application, Ser. No. 11/680,874, filed on Mar. 1, 2007. Priority is claimed from the filing date of the parent application. The entire content of that parent application is incorporated herein by reference.

BACKGROUND OF THE INVENTION

1. Technical Field

The present invention generally relates to computer network traffic, and in particular to network traffic shaping. Still more particularly, the present invention relates to traffic shaping of synchronous requests and responses.

2. Description of the Related Art

Computer networks are extensively utilized to exchange information in professional, personal, public, and private settings. Networks assist in obtaining and transmitting data locally and globally via devices that send and/or receive data over communications media. A large amount of information is exchanged daily throughout network systems around the world. As network managers strive to improve the Quality of Service (QoS) of networks by reducing dropped data, delays, out-of order delivery, and errors, network traffic congestion slows progress. In an attempt to control network traffic, minimize network congestion, and reduce failed transmission attempts (time-outs), traffic shaping is utilized. Traffic shaping optimizes performance of network bandwidth by controlling the volume of traffic being sent into a network and out from a network. Information is sent in segments via packets that contain the destination address in addition to the transmitted data.

Traditional traffic shaping can be implemented by utilizing queues to store packets, manipulating Transmission Control Protocol (TCP) windows, or silently dropping packets. Increased bandwidth consumption and higher demands on network QoS is an indication that traditional traffic shaping techniques may not be sufficient. While current methods for traffic shaping have proven to be effective, there are many disadvantages associated with existing traffic shaping techniques, which often result in less than ideal network data transmission.

Traffic shaping is typically implemented on an edge router or core router and provides a mechanism to control the amount, volume, and rate of data transmission into the network. The predominant methods for traffic shaping include a "leaky bucket" method and a "token bucket" method. The leaky bucket implementation is also utilized to control the rate at which data is sent into the network and provides a mechanism by which surges in data request can be shaped into a steady data stream. The leaky bucket implementation is typically employed for shaping traffic into flows with a fixed rate of admission into the network and is generally ineffective in providing a mechanism for shaping traffic into flows with variable rates of admission.

There are multiple problems associated with traditional methods of network traffic shaping. First, before selected for processing, data packets may be placed in queue. Queues store the packets until the operating system selects the queue and packet to process. A queue with high priority is always processed prior to a queue of lower priority. Therefore time sensitive information located in a low priority queue may be processed subsequent to information located in a higher priority queue.

Traditional traffic shaping methods also include adjusting the TCP window to control the flow of data over the network connection. Reducing the TCP window forces the transmitting device to send less data. Increasing the size of the TCP window allows more data to flow from the transmitting device. Unfortunately, changes in the TCP window may result in undesirable consequences. Network devices are often instructed to reduce or increase the size of the TCP window during heavy traffic. If the change is not performed immediately, then congestion occurs, and the delay may result in a halt in data transmission or dropped packets, forcing the client (e.g., an executing application) of the transmitting device to retransmit the data.

Currently, traffic shaping only operates by manipulating traffic at the packet level. Manipulating traffic at the packet level causes time-outs and loss of information. Packets may be dropped before, after, and during periods of high data transmission. Methods are in place to resolve network traffic problems by temporarily slowing transmission of packets, reducing rates of transmission, as well as selecting predetermined packets for transmission. None of these methods have proven to be ideal.

SUMMARY

Disclosed are a method, a system, and a computer program product for implementing traffic shaping by processing tasks as synchronous requests, where the tasks represent one or more units of work contained within a request. Before a request is sent through the network, that single request is inspected in order to derive the amount of work that the request would generate in the network. Thus, a measure of the amount of work (or number of tasks), rather than the amount of data, within a request is considered. An application level traffic manager queries the amount of work in that request compared to the amount of work that the network can support and the traffic manager generates a number of traffic envelopes. Based on the results of this query, "task pruning" may be implemented to break the request into smaller manageable task that fit into the traffic envelopes. Task pruning may also prevent one or more individual units of work from being permitted to proceed through the remainder of the network. Each individual unit of work is scheduled independent of the other units, and the system may thus permit only a subset of the work to be performed. Accordingly, by implementing task pruning, the system limits surges of data transmission requests, in order to avoid network congestion.

In one embodiment, the invention provides a method for traffic shaping by transmitting an intact synchronous request from a host data processing system to a remote data processing system via a computer network. The workload of the request is determined from the application layer of the Open Systems Interconnection (OSI) model by determining the number of traffic envelopes required for processing. For that request, if only a single traffic envelope is required, the traffic manager determines if the request may be sent. The traffic manager then approves/enables transmission of the intact request through the remainder of the network.

In another embodiment, the invention provides a method for traffic shaping by transmitting partitioned synchronous requests through the network. The workload of the request is determined at the application layer. Requests may be divided into smaller manageable tasks, based on the workload. The traffic manager determines how many of the smaller tasks may proceed. If the request requires more than one traffic envelope, then the request is divided into work units that correspond to the number of required envelopes. The work units (tasks) are sent through the remainder of the network in partitions that fit the available traffic envelope(s). The system permits as many smaller tasks as allowed by the traffic manager to proceed. The traffic manager identifies the number of envelopes to transmit through the network. The traffic manager enables/approves transmission of the partitioned request in envelopes to the remainder of the network.

In still another embodiment, the invention provides a method for traffic shaping by transmitting synchronous requests following request partitioning and task trimming. After determining the workload of the request at the application layer, task pruning may be performed. A software utility associated with the traffic manager (or a component of the traffic manager) trims the request (or partitioned request) until the request (or tasks) is suitable for transmission into the network by the available traffic envelopes. "Trimming" of the request (or tasks) removes redundant data or repetitive patterns without loss of information. The traffic manager enables/approves the transmission of the trimmed request or tasks to the remainder of the network.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
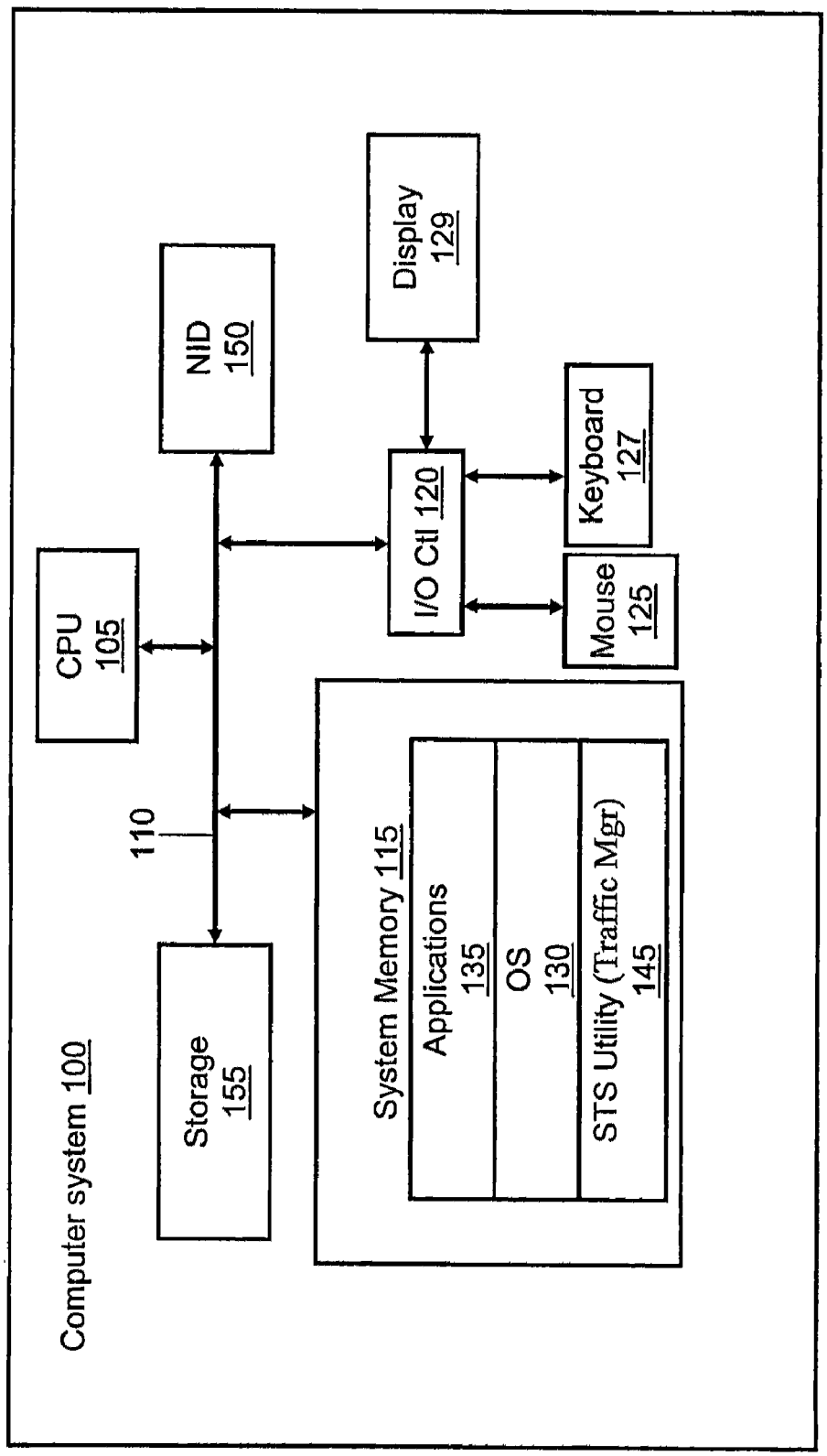
FIG. 1 is a diagram of an example data processing system utilized to implement an illustrative embodiment of the present invention.

The present invention provides a method, a system, and a computer program product for implementing traffic shaping by processing tasks as synchronous requests, where the tasks represent one or more units of work contained within a request. Before a request is sent through the network, that single request is inspected in order to derive the amount of work that the request would generate in the network. Thus, a measure of the amount of work (or number of tasks), rather than the amount of data, within a request is considered. An application level traffic manager queries the amount of work in that request compared to the amount of work that the network can support and generates a number of traffic envelopes. Based on the results of this query, "task pruning" may be implemented to break the request into smaller manageable task that fit into the traffic envelopes.

Task pruning may also prevent one or more individual units of work from being permitted to proceed through the remainder of the network. Each individual unit of work is scheduled independent of the other units, and the traffic manager may thus permit only a subset of the work to be performed. Accordingly, by implementing task pruning, the traffic manager limits surges of data transmission requests, in order to avoid network congestion.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g. 1xx for FIG. 1 and 2xx for FIG. 2). The specific numerals assigned to the elements are provided solely to aid in the description and not meant to imply any limitations (structural or functional) on the invention.

It is also understood that the use of specific parameter names are for example only and not meant to imply any limitations on the invention. Embodiments of the invention may thus be implemented with different nomenclature/terminology utilized to describe the above parameters, without limitation.

With reference now to the figures, FIG. 1 depicts a block diagram representation of a data processing system within which features of the invention may be advantageously implemented. Computer system 100 comprises a central processing unit (CPU) 105 coupled to system memory 115 and storage 155 via system bus/interconnect 110. Storage 155 allows computer system 100 to retain data locally. Also coupled to system bus 110 is an input/output controller (I/O Controller) 120, which controls access by several input devices, of which mouse 125 and keyboard 127 are illustrated. I/O Controller 120 also controls access to output devices, of which display 129 is illustrated. In order to support use of removable storage media, I/O Controller 120 may further support one or more USB ports (not specifically shown) and compact disk Read/Write (CDRW)/digital video disk (DVD) drive (also not shown).

Computer System 100 further comprises network interface device (NID) 150 by which computer system 100 is able to connect to and communicate with an external device or network (such as the Internet or local area network). NID 150 may be a modem or network adapter and may also be a wireless transceiver device.

Those of ordinary skill in the art will appreciate that the hardware depicted in FIG. 1 may vary. For example, other peripheral devices may be used in addition to or in place of the hardware depicted. Thus, the depicted example is not meant to imply architectural limitations with respect to the present invention. The data processing system depicted in FIG. 1 may be, for example, an IBM eServer pSeries system, a product of International Business Machines Corporation in Armonk, N.Y., running the Advanced Interactive Executive (AIX) operating system or LINUX operating system.

Various features of the invention are provided as software code stored within system memory 115 or other storage and executed by CPU 105. Among the software code is code for enabling network connection and communication via NID 150, and more specific to the invention, code for enabling the synchronous traffic shaping features described below. For simplicity, the collective body of code that enables the synchronous traffic shaping features is referred to herein as STS utility. In actual implementation, the STS utility may be integrated within existing operating system (OS) code to provide the synchronous traffic shaping functionality described below. In the described embodiment, STS utility is integrated into the traffic manager and is a component of traffic manager, providing enhanced traffic manager functions.

Thus, as shown by FIG. 1, in addition to the above described hardware components, data processing system 100 further comprises a number of software components, including operating system (OS) 130 (e.g., Microsoft Windows®, a trademark of Microsoft Corp, or GNU®/Linux®, registered trademarks of the Free Software Foundation and The Linux Mark Institute), one or more software applications 135, and STS utility 145. In implementation, OS 130 and STS utility 145 are located within system memory 115 and executed on CPU 105. According to the illustrative embodiment, when CPU 105 executes STS utility 145, STS utility 145 enables traffic manager executing within computer system 100 to complete a series of functional processes, including: (1) synchronous traffic shaping within a computer network, utilizing task trimming for request that require a single traffic envelope; (2) synchronous traffic shaping utilizing task pruning with multiple traffic envelopes; and (3) synchronous traffic shaping utilizing task pruning, including selective discarding of portions of information; and other features/functionalities described below and illustrated by FIGS. 2-5. As utilized herein, task pruning comprises a number of independent processes including: (a) request partitioning, which involves dividing the request into smaller manageable tasks, representing the units of work within the request; (b) task trimming, by which portions of each task (e.g., redundant or repetitive portions) are trimmed to enable the task to fit within the traffic envelopes, without loss of relevant information; and (c) selective discarding, by which those portions of the task, which are not required to be transmitted through the network to perform the request within the network are not forwarded to the traffic manager for transmission through the network.

Figure 2:
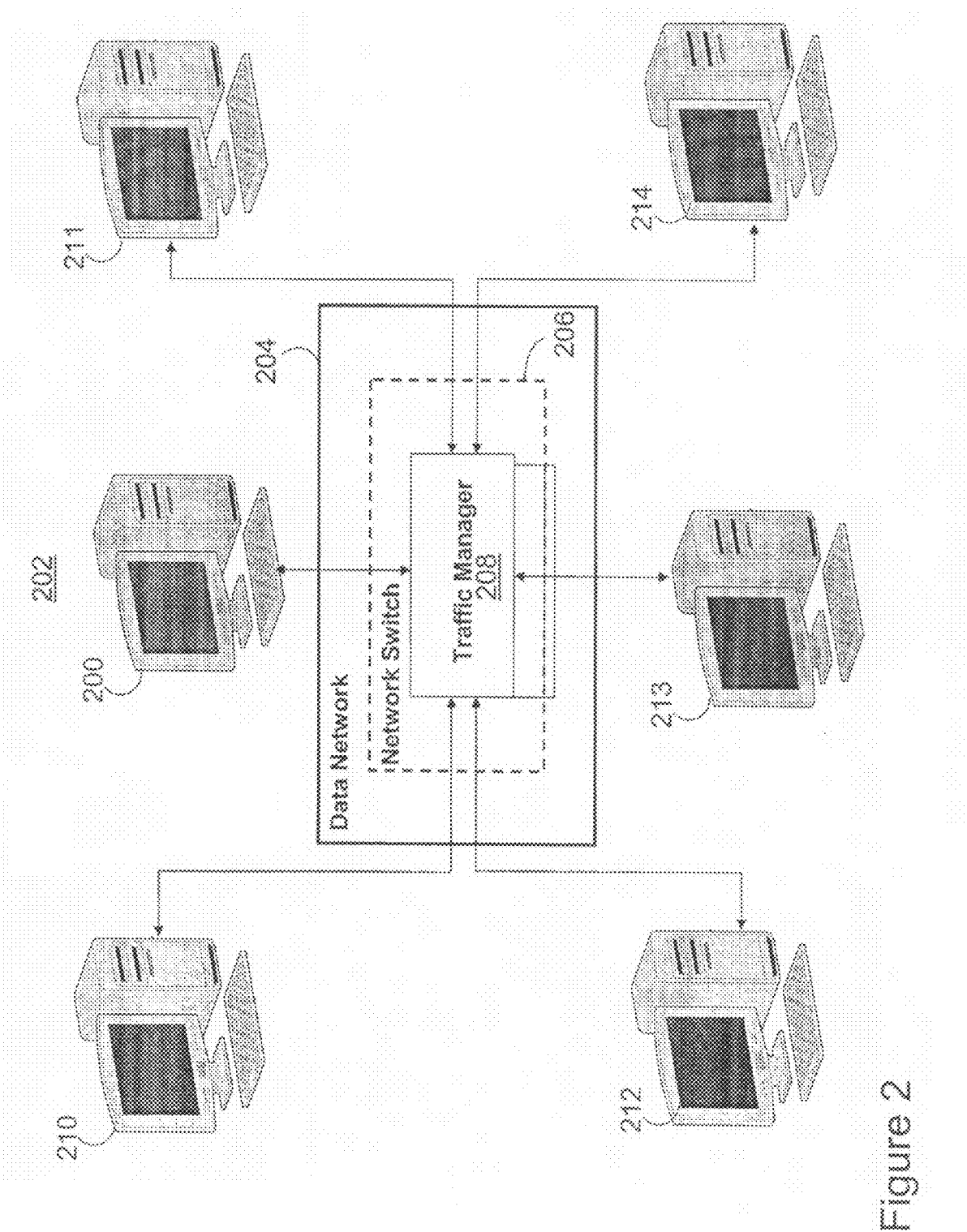
FIG. 2 is a diagram of an environment in which computers with synchronous transmission traffic shaping software linked to a traffic manager may implement traffic shaping in accordance with an illustrative embodiment of the present invention.

Network 202 of FIG. 2 illustrates an example data network in which the present invention may be implemented. Network 202 comprises computer system 200, which operates as the sending computer system, and other computer systems 210 through 214 (sending or receiving computer systems), all of which may be similar to computer system 100 of FIG. 1. Computer system 200 encompasses the hardware and software required for synchronous traffic shaping and data transmission to data network 204. Data network 204, such as a public Internet Protocol (IP) network, is linked to network switch 206. Computer system 200 transmits and receives data via network switch 206 linked to data network 204. Network switch 206 includes traffic manager 208 to assist with traffic shaping, according to one embodiment of this invention.

In the illustrative embodiment, network switch 206 is a networking device that enables data network 204 to utilize multiple network connections. Network switch 206 may be a full duplex network switch that allows synchronous transmission of tasks from multiple computer systems. Computer system 200 sends information to a remote user via data network 204. Requests for data transmission are received at traffic manager 208 from computer system 200. When traffic manager 208 receives the requests, traffic manager 208 implements traffic shaping, which may involve traffic pruning, described in greater detail below.

Figure 3:
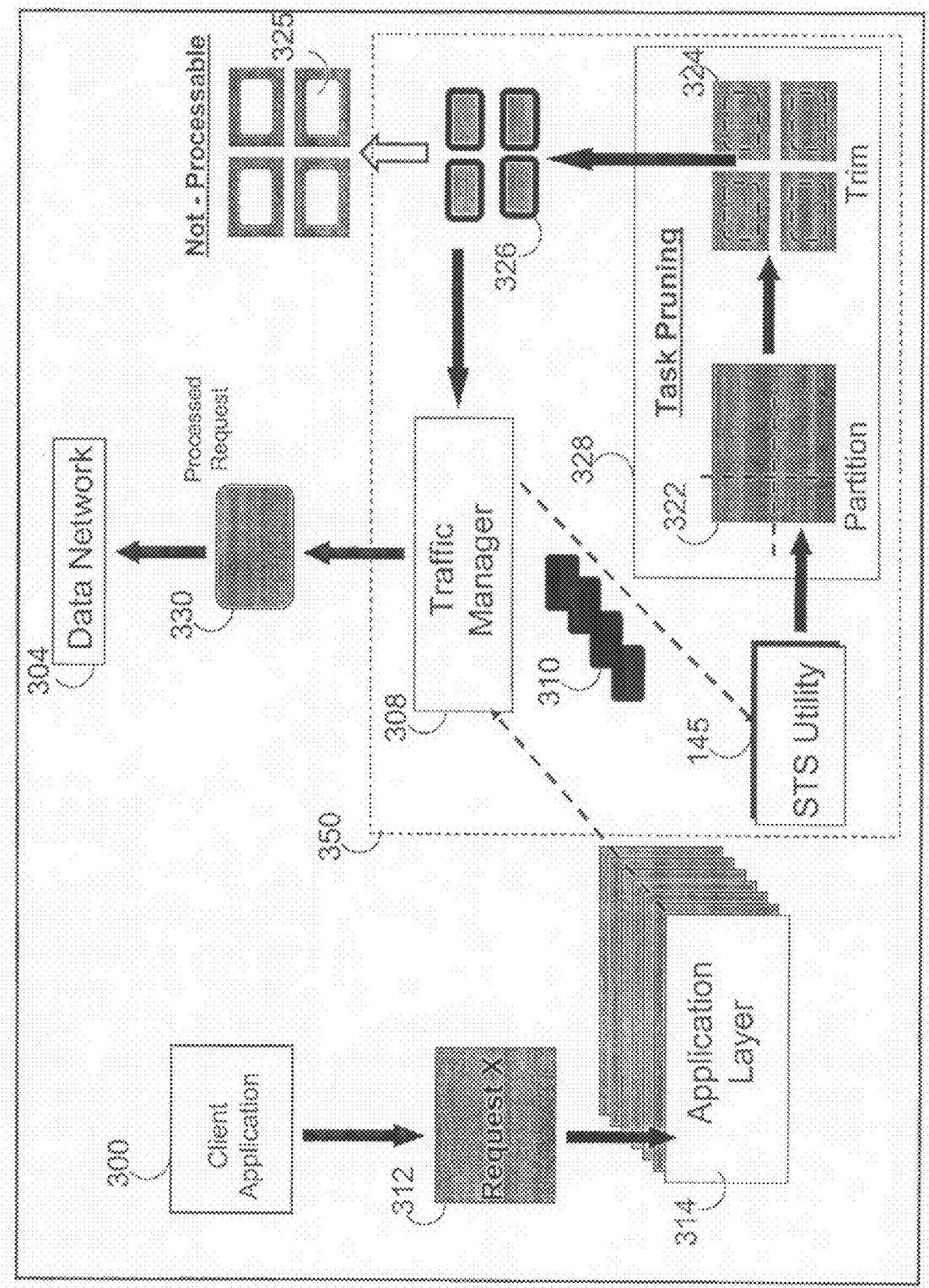
FIG. 3 illustrates an environment for which a system may implement synchronous traffic shaping in accordance with an illustrative embodiment of the present invention.

In the illustrative embodiments, traffic shaping is implemented by determining the workload of synchronous request sent to traffic manager 208 from a client application ("client") on computer system 200. Determining the workload of the request verses the amount of data may avoid timeouts in synchronous delay intolerant network services. Traffic manager 208 determines the number of traffic envelopes required for transmission of the request, as illustrated by FIG. 3, and the method proceeds with administering a suitable number of traffic envelopes.

Specifically, traffic manager 208 calculates the number of admissible task permitted to transmit through data network 204, while avoiding congestion within the network. In one embodiment, traffic manager 208 communicates a number of transmittable traffic envelopes to requesting computer system 200, and computer system 200 utilizes the application layer of the network software to determine the workload of the request. In another embodiment, traffic manager itself completes the determination of the workload of the request, and performs the required traffic shaping based on that determination and other detected/measured network parameters. FIG. 3 is an illustrative embodiment of the implementation of synchronous traffic shaping, according to one embodiment. Client application 300 comprises the software and hardware necessary to transmit and receive information from data network 304. More specifically client application 300 transmits request X 312 to the Internet utilizing Transmission Control Protocol/Internet Protocol (TCP/IP). Application layer 314 receives the request from client application 300, then queries traffic manager 308 to determine the number of traffic envelopes required to complete the transmission of request X 312 to data network 304. Traffic manager 308 replies to application layer 314 with the number of currently transmissible traffic envelopes 310. For a request requiring greater than one envelope or task trimming to enable the request to fit within a single envelope, STS utility 145 is utilized to perform one or more of the functions of task pruning 328 (i.e., request partitioning, task trimming, and or selective discarding), as described below.

In another embodiment, and as illustrated by the dashed line 350, the traffic shaping functionality of STS utility is performed as a part of traffic manager functions. With the present embodiment, application layer 314 receives the request from client application 300 then forwards the request to traffic manager 308. On receipt of this request, traffic manager 308 performs a series of functions, including: (a) determining the number of traffic envelopes required to complete the transmission of request X 312 to data network 304 and (b) performing traffic shaping, as required, and (c) enabling/approving transmission of shaped traffic to the network. Traffic manager 308 determines the number of currently transmissible traffic envelopes 310. For a request requiring greater than one envelope or task trimming to enable the request to fit within a single envelope, STS utility 145 (which is associated with or a component of traffic manager) performs one or more of the functions of task pruning 328 (i.e., request partitioning, task trimming, and or selective discarding), as described below.

In one embodiment of the invention, client application 300 sends request X 312 to application layer 314. Application layer 314 of the Open Systems Interconnection (OSI) Model provides a means for client application 300 to access data network 304. Application layer 314 is a protocol utilized to support transmission of request X 312 from client application 300. Information provided to data network 304 such as data, text, voice, video, etc. can be characterized by traffic envelope(s) 310. In the current embodiment, application layer 314 receives permission to partition request X 312 into four traffic envelopes. Traffic envelopes 310 are characterized by a set of parameters including long-term average transmission rate, peak rate, and maximum burst tolerance. The value of each information parameter is based on the QoS level specified.

In a further embodiment of the invention, request X 312 must be partitioned into request suitable to fit the number of traffic envelopes 310. The current traffic shaping strategy utilizes task pruning 328 to limit surges in request that congest a network. Task pruning is performed by STS utility 145. Request X 312 is broken down into partitioned tasks 322 and sent into the network as synchronous request 326 that fit into available traffic envelopes. However, if the partitioned tasks do not fit into the available traffic envelopes, further task pruning is performed. Partitioned tasks 322 are trimmed and forwarded, and the remainder is marked as "not-processable," as illustrated with remainder trim 325. As illustrated in task pruning 328, trimmed task 324, bearing required information for transmission, merges with traffic envelopes 310 to provide traffic shaping of synchronous request 326. Traffic manager 308 thus receives synchronous request 326 and transmits processed request 330 to data network 304.

Thus, as provided, task pruning 328 first partitions request X 312 into tasks 322 to complement the number of traffic envelopes 310 allotted for transmission to data network 304 by traffic manager 308. Then, if partitioned tasks 322 do not meet the size requirement of traffic envelopes 310, partitioned tasks 322 are trimmed. Trimmed tasks 324 are then merged with (i.e., encapsulated with) traffic envelopes 310 to provide synchronous requests 326. These synchronous requests 326 are sent to traffic manager 308, and are permitted to proceed to data network 304 as processed request(s) 330.

The trimmed portions (remainder trim 325) of request X 312 are marked as "not-processable". Remainder trim 325 is marked as "non-processable" when the approved network traffic envelope(s) 310 have been filled.

In one embodiment of the invention, the request fits completely into a single traffic envelope and thus no partitioning is required. With the illustrated embodiment, for example, request X 312 is not partitioned, and request X 312 is encapsulated with a single traffic envelope and transmitted to data network 304 via traffic manager 308. In another embodiment of the invention, request X 312 may require one traffic envelope, as determined by traffic manager 308. However, unlike the above embodiment, request X 312 may require task pruning in the form of trimming to fit within the single envelope. In this instance, request X 312 is trimmed by STS utility 145, prior to request X being encapsulated with the traffic envelope. After encapsulation of request X 312 with the traffic envelope, the request is sent to traffic manager 308 for transmitting through the network.

Figure 4:
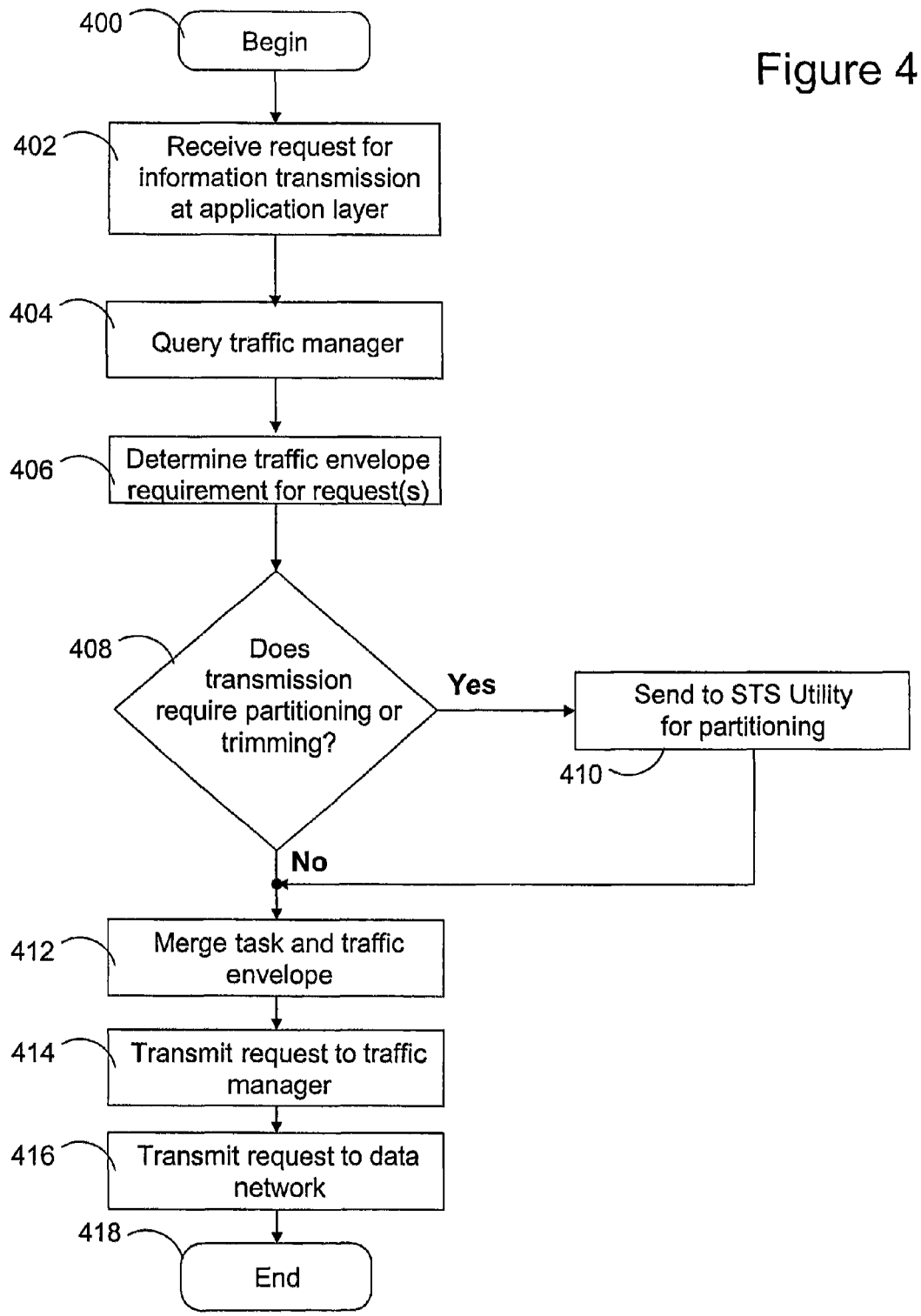
FIG. 4 is a logic flow chart illustrating implementation of synchronous traffic shaping of tasks requiring one traffic envelope in accordance with one embodiment of the invention.

FIG. 4 illustrates a flow chart illustrating implementation of synchronous traffic shaping of tasks requiring a single traffic envelope in accordance with one embodiment of the invention. The process begins at step 400, where the request for information transmission to the data network is sent from the client device. The application layer receives the "request" for information transmission at step 402. At step 404, the application layer queries the traffic manager, which evaluates the workload of the request and determines the number of traffic envelopes required for transmitting the request, at step 406. The number of traffic envelopes required is determined and sent to the application layer. In another embodiment, step 404 involves transmitting the request to the traffic manager, which completes the traffic shaping processes utilizing the STS utility, which is associated therewith (or a component thereof). Enhanced traffic manager functionality is thus provided.

A decision is made at step 408 whether the request requires pruning (i.e., partitioning and/or trimming) to fit into the available traffic envelope(s). If no partitioning or trimming is required for the present request, the request (or task provided by the request) is encapsulated within the traffic envelope in step 412. However, if the request requires partitioning or trimming, the request is sent to the STS utility at step 410, for further processing. After the request is encapsulated within the traffic envelope, at step 412, the traffic envelope(s) are transmitted to the traffic manager, at step 414. At, step 416, the processed request (within the traffic envelope) is transmitted to the data network. The process ends at step 418.

Figure 5:
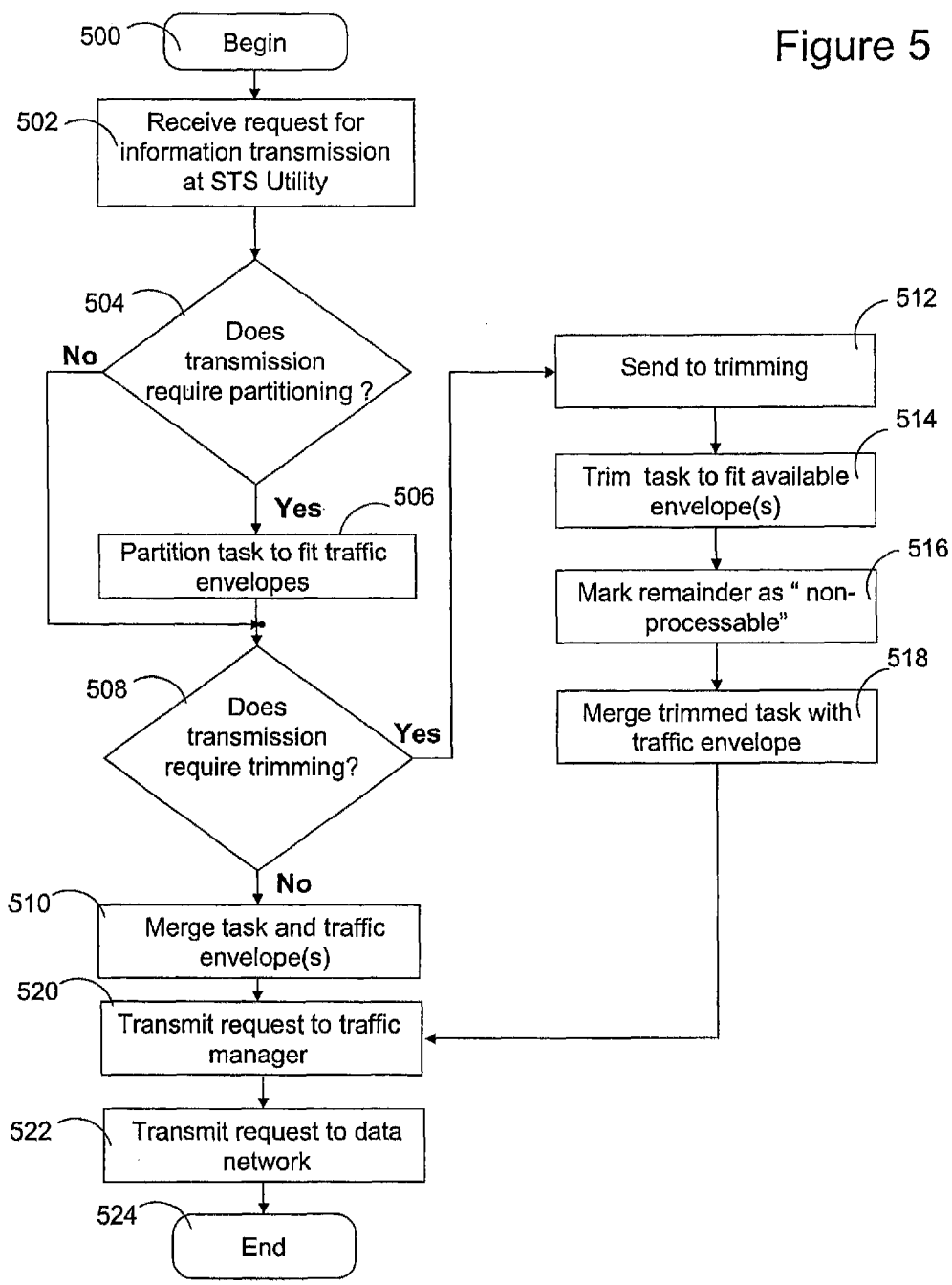
FIG. 5 is a logic flow chart illustrating implementation of synchronous traffic shaping of tasks with task pruning in accordance with one embodiment of the invention.

FIG. 5 is a flow chart illustrating how synchronous traffic shaping for requests requiring partitioning and trimming may be implemented. The process begins at step 500, where a request, which requires additional partitioning or trimming before being transmitted into the network, is forwarded to the STS utility. The request is received by the STS utility at step 502 along with the number and size of the traffic envelope(s). At step 504, a determination is made whether the transmission of the request requires partitioning. If the request requires partitioning, the request is partitioned into a number of tasks equal to the number of available traffic envelopes, at step 506.

At step 504, if the request does not require partitioning, or after partitioning of the request into tasks, a next determination is made at step 508 whether the request (or tasks), require trimming. If trimming is required, the request (or tasks) is sent to the trimming function within the STS utility at step 512. The request (or tasks) is trimmed to fit within the traffic envelope(s) at step 514. At step 516, the trimmed request (or tasks) is encapsulated within the traffic envelope(s). The remainder portions of the request (or tasks) are marked as "non-processable" at step 518.

Returning to decision block 508, if no trimming is required, the request (or task(s)) is encapsulated into the traffic envelope(s) (without trimming), at step 510. The traffic envelope(s) are then scheduled by the traffic manager at step 520. Thus, following partitioning and/or trimming, as required, all requests and/or tasks are encapsulated into envelopes, which are scheduled for transmission by the traffic manager. The traffic manager processes the envelope(s) containing the request (or tasks), and then the traffic manager transmits the processed request (or tasks) to the data network as synchronous request(s), at step 522. The process ends at step 524.

In the flow charts above, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

Thus, the embodiments provide a method, a system, and a computer program product for implementing traffic shaping by processing tasks as synchronous requests, where the tasks represent requests that contain one or more units of work. Each individual unit of work is scheduled independent of the other units, and the system may thus permit a subset of the work to be performed. A measure of the amount of work (or number of tasks), rather than the amount of data, within a request is considered to avoid congestion on the network. Task pruning may be implemented to prevent redundant portions of the one or more individual units of work from being permitted to proceed through the remainder of the network. With task pruning, requests are divided into smaller tasks, and then the smaller tasks are sent through the remainder of the network in partitions that fit the traffic envelopes. The system permits as many smaller tasks as allowed by the traffic manager to proceed, and thus limits surges of data transmission requests, while substantially reducing network congestion.

As a final matter, it is important that while an illustrative embodiment of the present invention has been, and will continue to be, described in the context of a fully functional computer system with installed software, those skilled in the art will appreciate that the software aspects of an illustrative embodiment of the present invention are capable of being distributed as a program product in a variety of forms, and that an illustrative embodiment of the present invention applies equally. Examples of media include recordable type media such as floppy disks, hard disk drives, and CD ROMs.

While the invention has been particularly shown and described with reference to a preferred embodiment, it will be understood by those skilled in the art that various changes in form and detail may be made therein without departing from the spirit and scope of the invention.

What is claimed is:

1. A method comprising:
    receiving, at an application-level traffic manager, a request from a client application to transmit an amount of work to a remote data processing system via a network;
    evaluating an application-level amount of work at an application layer of the remote data processing system that the requested amount of work would generate compared to a currently supported application-level amount of work within the application layer of the remote data processing system;
    calculating a number of traffic envelopes that represent the currently supported application-level amount of work within the application layer of the remote data processing system and that reduce congestion within the network that would result from application-layer retransmissions;
    generating a response comprising the calculated number of traffic envelopes, where the calculated number of traffic envelopes are assigned to the requested amount of work; and
    in response to detecting receipt of one or more traffic envelopes comprising at least a portion of the requested amount of work encapsulated therein, transmitting the one or more traffic envelopes as a synchronous request to the remote data processing system through the network.

2. The method of claim 1, further comprising: when the requested amount of work requires pruning prior to the transmitting based upon the calculated number of traffic envelopes, pruning the requested amount of work to fit the at least the portion of the requested amount of work into the one or more traffic envelopes.

3. The method of claim 2, wherein said pruning of the requested amount of work comprises:
    encapsulating a pruned output as the portion of the requested amount of work within the one or more traffic envelopes;
    forwarding the pruned output encapsulated within the one or more traffic envelopes for transmission to the remote data processing system through the network; and
    preventing transmission of remaining portions of the requested amount of work that are not encapsulated within the one or more traffic envelopes, where only the currently supported application-level amount of work within the application layer of the remote data processing system as represented by the one or more traffic envelopes is transmitted through the network to the remote data processing system by the application-level traffic manager.

4. The method of claim 2, where, when a single traffic envelope is required to transmit the requested amount of work, pruning of the requested amount of work comprises:
    determining if the requested amount of work requires trimming to fit within the single traffic envelope, where trimming removes one of redundant data and repetitive patterns associated with the requested amount of work without loss of information;
    when trimming is not required, transmitting the requested amount of work without trimming; and
    when trimming is required, trimming the requested amount of work to fit within the single traffic envelope prior to transmitting the requested amount of work;
    where the requested amount of work is transmitted within the single traffic envelope.

5. The method of claim 2, where when multiple traffic envelopes are required to transmit the requested amount of work, pruning of the requested amount of work comprises:
    partitioning the requested amount of work into smaller tasks, where the requested amount of work is partitioned into a same number of tasks as the calculated number of traffic envelopes received from the application-level traffic manager, and where the tasks are representative of units of work to be completed;
    trimming one or more of the tasks to enable each task to fit within one of the multiple traffic envelopes, where trimming removes one of redundant data and repetitive patterns associated with the requested amount of work without loss of information; and
    forwarding the tasks, encapsulated within the multiple traffic envelopes, as synchronous requests for synchronous transmission to the remote data processing system through the network by the application-level traffic manager, where the application-level traffic manager receives the multiple traffic envelopes and transmits the tasks as synchronous requests to the remote data processing system.

6. The method of claim 2, where pruning the requested amount of work comprises:
    removing a portion of the requested amount of work comprising trimming one or more of redundant data and repetitive patterns within the request, where removal of the removed portion does not result in a loss of relevant information from the requested amount of work;
    marking the removed portion of the requested amount of work to indicate that the removed portion should not be forwarded for transmission to the remote data processing system through the network;
    when partitioning of the requested amount of work into smaller tasks is required, forwarding the request to a utility that completes the partitioning of the requested amount of work; and
    when trimming of one of the requested amount of work and at least one of the smaller tasks is required, forwarding the request to a utility that completes the trimming.

7. The method of claim 2, further comprising:
    encapsulating the requested amount of work and tasks into the one or more traffic envelopes, where the requested amount of work is divided up into work units equal to the calculated number of traffic envelopes, the one or more traffic envelopes encapsulating therein one of:
- complete work that does not require pruning before transmission;
- work that has been trimmed, where the work that has been trimmed comprises work with removed one of redundant data and repetitive patterns associated with the requested amount of work without loss of information;
- a plurality of tasks generated from the requested amount of work that has been partitioned into a number of tasks equal to the calculated number of traffic envelopes; and
- the plurality of tasks, with at least one task having been trimmed to fit within the one or more traffic envelopes.

8. The method of claim 1, further comprising:
querying the requested amount of work;
comparing the requested amount of work to the currently supported application-level amount of work within the application layer of the remote data processing system; and
where calculating the number of traffic envelopes comprises determining the number of traffic envelopes necessary for transmission of the requested amount of work, where the determining evaluates a plurality of factors related to an amount of information related to the requested amount of work, comprising at least one of data, text, voice, or video to be transmitted by the requested amount of work.

9. A computer program product comprising:
a computer readable storage device; and
program instructions on the computer readable storage device that when executed by a processor performs functions of:
receiving, at an application-level traffic manager, a request from a client application to transmit an amount of work to a remote data processing system via a network;
evaluating an application-level amount of work at an application layer of the remote data processing system that the requested amount of work would generate compared to a currently supported application-level amount of work within the application layer of the remote data processing system;
calculating a number of traffic envelopes that represent the currently supported application-level amount of work within the application layer of the remote data processing system and that reduce congestion within the network that would result from application-layer retransmissions based upon evaluation of a plurality of factors related to an amount of information related to the requested amount of work, comprising at least one of data, text, voice, or video to be transmitted by the requested amount of work;
generating a response comprising the calculated number of traffic envelopes, where the calculated number of traffic envelopes are assigned to the requested amount of work; and
in response to detecting receipt of the one or more traffic envelopes comprising at least a portion of the requested amount of work encapsulated therein, transmitting the one or more traffic envelopes as a synchronous request to the remote data processing system through the network.

10. The computer program product of claim 9, further comprising program instructions for pruning the requested amount of work to fit the at least the portion of the requested amount of work into the one or more traffic envelopes when the requested amount of work requires pruning prior to the transmitting, where the program instructions for pruning comprise program instructions for:
- encapsulating a pruned output as the portion of the requested amount of work within the one or more traffic envelopes;
- forwarding the pruned output encapsulated within the one or more traffic envelopes for transmission to the remote data processing system through the network; and
- preventing transmission of remaining portions of the requested amount of work that are not encapsulated within the one or more traffic envelopes, where only the currently supported application-level amount of work within the application layer of the remote data processing system as represented by the one or more traffic envelopes is transmitted through the network to the remote data processing system by the application-level traffic manager.

11. The computer program product of claim 10, where, when a single traffic envelope is required to transmit the requested amount of work, the program instructions for pruning comprise program instructions for:
- determining if the requested amount of work requires trimming to fit within the single traffic envelope, where trimming removes one of redundant data and repetitive patterns associated with the requested amount of work without loss of information;
- when trimming is not required, transmitting the requested amount of work without trimming; and
- when trimming is required, trimming the requested amount of work to fit within the single traffic envelope prior to transmitting the requested amount of work;
- where the requested amount of work is transmitted within the single traffic envelope.

12. The computer program product of claim 10, where when multiple traffic envelopes are required to transmit the requested amount of work, the program instructions for pruning of the requested amount of work comprise program instructions for:
- partitioning the requested amount of work into smaller tasks, where the requested amount of work is partitioned into a same number of tasks as the calculated number of traffic envelopes received from the application-level traffic manager, and where the tasks are representative of units of work to be completed;
- trimming one or more of the tasks to enable each task to fit within one of the multiple traffic envelopes, where trimming removes one of redundant data and repetitive patterns associated with the requested amount of work without loss of information; and
- forwarding the tasks, encapsulated within the multiple traffic envelopes, as synchronous requests for synchronous transmission to the remote data processing system through the network by the application-level traffic manager, where the application-level traffic manager receives the multiple traffic envelopes and transmits the tasks as synchronous requests to the remote data processing system.

13. The computer program product of claim 10, where the program instructions for pruning of the requested amount of work comprise program instructions for:
- removing a portion of the requested amount of work comprising trimming one or more of redundant data and repetitive patterns within the request, where removal of the removed portion does not result in a loss of relevant information from the requested amount of work; and marking the removed portion of the requested amount of work to indicate that the removed portion should not be forwarded for transmission to the remote data processing system through the network;

when partitioning of the requested amount of work into smaller tasks is required, forwarding the request to a utility that completes the partitioning of the requested amount of work; and when trimming of one of the requested amount of work and at least one of the smaller tasks is required, forwarding the request to a utility that completes the trimming.

14. The computer program product of claim 10, further comprising program instructions for:

encapsulating the requested amount of work and tasks into the one or more traffic envelopes, where the requested amount of work is divided up into work units equal to the calculated number of traffic envelopes, the one or more traffic envelopes encapsulating therein one of:

complete work that does not require pruning before transmission;

work that has been trimmed, where the work that has been trimmed comprises work with removed one of redundant data and repetitive patterns associated with the requested amount of work without loss of information;

a plurality of tasks generated from the requested amount of work that has been partitioned into a number of tasks equal to the calculated number of traffic envelopes; and the plurality of tasks, with at least one task having been trimmed to fit within the one or more traffic envelopes.

15. A device comprising:

a processor; and an application-level traffic manager, comprising an associated traffic shaping utility, the application-level traffic manager comprising program instructions that when executed on the processor performs functions of:

receiving a request from a client application to transmit an amount of work to a remote data processing system via a network;

evaluating an application-level amount of work at an application layer of the remote data processing system that the requested amount of work would generate compared to a currently supported application-level amount of work within the application layer of the remote data processing system;

evaluating a currently supported application-level amount of work at the application layer of the remote data processing system and that reduce congestion within the network that would result from application-layer retransmissions based upon a plurality of factors related to an amount of information related to the requested amount of work, comprising at least one of data, text, voice, or video to be transmitted by the requested amount of work;

generating a response comprising a calculated number of traffic envelopes that represent the currently supported application-level amount of work within the application layer of the remote data processing system without congestion, where the calculated number of traffic envelopes are assigned to the requested amount of work; and in response to detecting receipt of one or more traffic envelopes comprising at least a portion of the requested amount of work encapsulated therein, transmitting the one or more traffic envelopes as a synchronous request to the remote data processing system through the network.

16. The device of claim 15, where the program instructions further comprise program instructions that when executed on the processor performs the functions of pruning the requested amount of work to fit the at least the portion of the requested amount of work into the one or more traffic envelopes when the requested amount of work requires pruning prior to the transmitting, where the pruning of the requested amount of work comprises:

encapsulating a pruned output as the portion of the requested amount of work within the one or more traffic envelopes;

forwarding the pruned output encapsulated within the one or more traffic envelopes for transmission to the remote data processing system through the network; and preventing transmission of remaining portions of the requested amount of work that are not encapsulated within the one or more traffic envelopes, where only the currently supported application-level amount of work within the application layer of the remote data processing system as represented by the one or more traffic envelopes is transmitted through the network to the remote data processing system by the application-level traffic manager.

17. The device of claim 16, where, when a single traffic envelope is required to transmit the requested amount of work, the program instructions for pruning comprise program instructions that when executed on the processor performs the functions of:

determining if the requested amount of work requires trimming to fit within the single traffic envelope, where trimming removes one of redundant data and repetitive patterns associated with the requested amount of work without loss of information;

when trimming is not required, transmitting the requested amount of work without trimming; and when trimming is required, trimming the requested amount of work to fit within the single traffic envelope prior to transmitting the requested amount of work;

where the requested amount of work is transmitted within the single traffic envelope.

18. The device of claim 16, where when multiple traffic envelopes are required to transmit the requested amount of work, the program instructions for pruning of the requested amount of work comprise program instructions that when executed on the processor performs the functions of:

partitioning the requested amount of work into smaller tasks, where the requested amount of work is partitioned into a same number of tasks as the calculated number of traffic envelopes received from the application-level traffic manager, and where the tasks are representative of units of work to be completed;

trimming one or more of the tasks to enable each task to fit within one of the multiple traffic envelopes, where trimming removes one of redundant data and repetitive patterns associated with the requested amount of work without loss of information; and forwarding the tasks, encapsulated within the multiple traffic envelopes, as synchronous requests for synchronous transmission to the remote data processing system through the network by the application-level traffic manager, where the application-level traffic manager receives the multiple traffic envelopes and transmits the tasks as synchronous requests to the remote data processing system.

19. The device of claim 16, where the program instructions for pruning of the requested amount of work comprise program instructions that when executed on the processor performs the functions of:

removing a portion of the requested amount of work comprising trimming one or more of redundant data and repetitive patterns within the request, where removal of the removed portion does not result in a loss of relevant information from the requested amount of work;

marking the removed portion of the requested amount of work to indicate that the removed portion should not be forwarded for transmission to the remote data processing system through the network;

when partitioning of the requested amount of work into smaller tasks is required, forwarding the request to a utility that completes the partitioning of the requested amount of work; and when trimming of one of the requested amount of work and at least one of the smaller tasks is required, forwarding the request to a utility that completes the trimming.

20. The device of claim 16, the application-level traffic manager further comprising program instructions that when executed on the processor performs the functions of:

encapsulating the requested amount of work and tasks into the one or more traffic envelopes, where the requested amount of work is divided up into work units equal to the calculated number of traffic envelopes, the one or more traffic envelopes encapsulating therein one of:

complete work that does not require pruning before transmission;

work that has been trimmed, where the work that has been trimmed comprises work with removed one of redundant data and repetitive patterns associated with the requested amount of work without loss of information;

a plurality of tasks generated from the requested amount of work that has been partitioned into a number of tasks equal to the calculated number of traffic envelopes; and the plurality of tasks, with at least one task having been trimmed to fit within the one or more traffic envelopes.

\* \* \* \* \*